United States Patent
Kang et al.

(10) Patent No.: US 6,990,341 B2
(45) Date of Patent: Jan. 24, 2006

(54) METHOD FOR TRANSMITTING MESSAGE IN PAGING CHANNEL

(75) Inventors: Woo Seok Kang, Seoul (KR); Ji Young Hwang, Anyang-shi (KR); Sung Hyun Nam, Suwon-shi (KR)

(73) Assignee: LG Electronics Inc., Seoul (KR)

( * ) Notice: Subject to any disclaimer, the term of this patent is extended or adjusted under 35 U.S.C. 154(b) by 677 days.

(21) Appl. No.: 10/029,277

(22) Filed: Dec. 28, 2001

(65) Prior Publication Data
US 2003/0054820 A1     Mar. 20, 2003

(30) Foreign Application Priority Data
Dec. 30, 2000 (KR) ................................ 2000-86725
Dec. 12, 2001 (KR) ................................ 2001-78549

(51) Int. Cl.
*H04Q 7/20* (2006.01)

(52) U.S. Cl. ...................... 455/434; 455/515; 455/458; 455/450; 455/455; 455/464; 370/337; 370/347; 370/335; 370/342

(58) Field of Classification Search ................. 370/335, 370/342, 337, 347; 455/434, 458, 515, 450, 455/455, 464, 509, 511
See application file for complete search history.

(56) References Cited

U.S. PATENT DOCUMENTS

| | | | |
|---|---|---|---|
| 6,374,103 B1 * | 4/2002 | Kamel et al. | 455/434 |
| 6,526,027 B1 * | 2/2003 | Yeom | 370/312 |
| 6,574,211 B2 * | 6/2003 | Padovani et al. | 370/347 |
| 6,754,229 B1 * | 6/2004 | Islam et al. | 370/468 |

\* cited by examiner

*Primary Examiner*—Temica M. Beamer
*Assistant Examiner*—Anthony S. Addy
(74) *Attorney, Agent, or Firm*—Fleshner & Kim, LLP

(57) ABSTRACT

A method for transmitting messages on a paging channel is disclosed, in which data burst messages are efficiently transmitted through the paging channel. If the data burst messages transmitted through the paging channel are not transmitted on their slots due to overhead messages, the data burst messages are delayed by a next overhead message transmission period having no overhead message in a system which does not employ a corrected quick paging channel while the data burst messages are first transmitted within a limited range in a system which employs a corrected quick paging channel. Therefore, a receiving rate of the data burst messages can be improved.

20 Claims, 3 Drawing Sheets

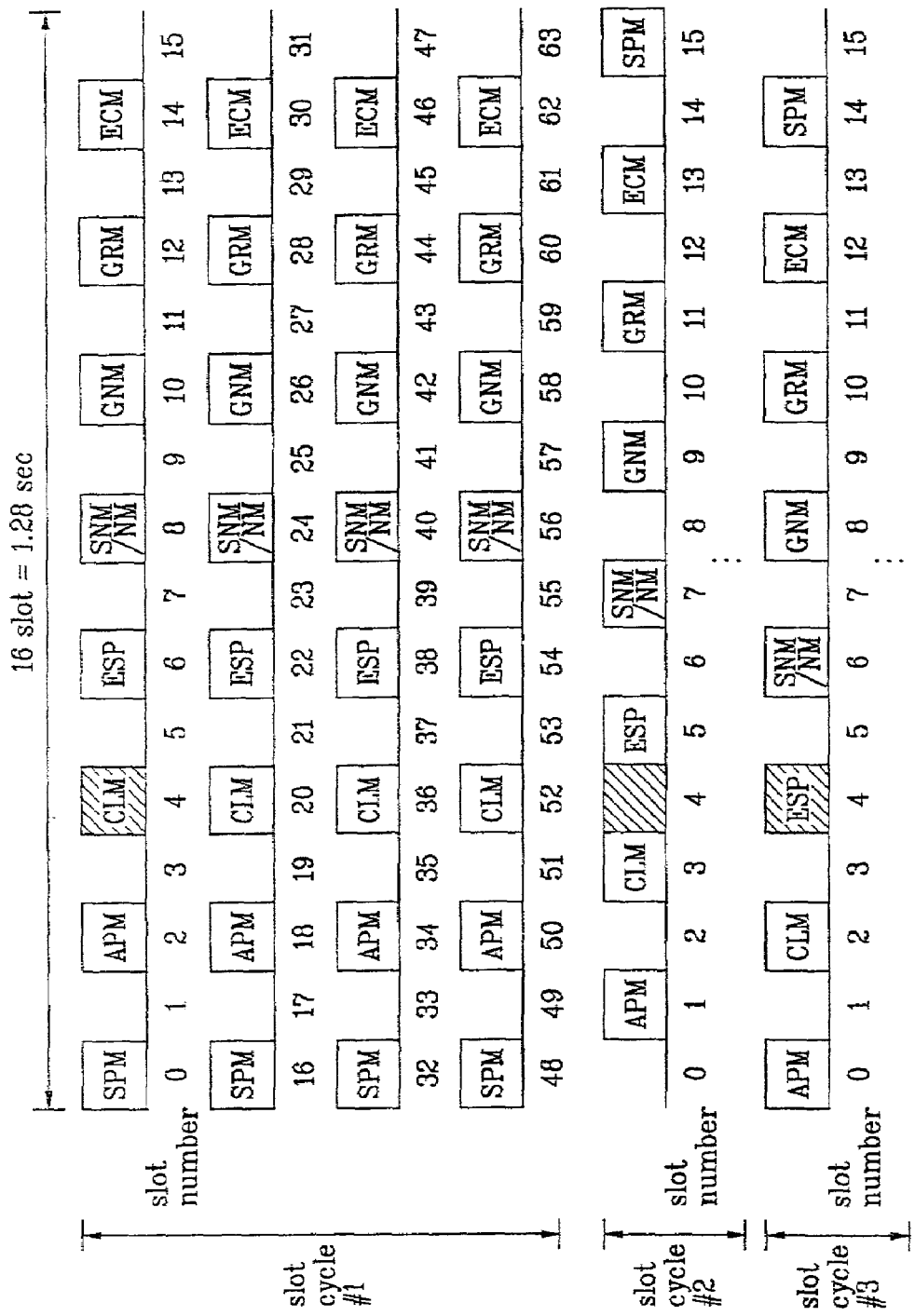

METHOD FOR TRANSMITTING MESSAGE IN PAGING CHANNEL

This application claims the benefit of the Korean Application No. P2000-86725 filed on Dec. 30, 2000, which is hereby incorporated by reference.

BACKGROUND OF THE INVENTION

1. Field of the Invention

The present invention relates to a mobile communication system, and more particularly, to a method for transmitting messages on a paging channel, in which data burst messages are efficiently transmitted through the paging channel.

2. Discussion of the Related Art

Generally, messages containing short data transmitted through a paging channel are called data burst messages. Also, messages transmitted together with the data burst messages and containing system information and prior information of data transmitted through the paging channel are called overhead messages.

To acquire a system and receive services, a terminal unit should receive all the overhead messages to recognize information of a corresponding system. Accordingly, in case where the data burst messages and the overhead messages should be transmitted on one slot, the overhead messages having higher priority order are first transmitted and the data burst messages are then transmitted. Thus, the terminal unit periodically receives the overhead messages to acquire latest system information and services.

A related art IS-95A system includes five types of overhead messages to be transmitted. To transmit the five overhead messages at least once for 1.28 seconds (16 slots), a transmission interval of the overhead messages is sufficient for 3 slots. Therefore, the paging channel has small transmission load of the overhead messages and delay of the data burst messages rarely occurs.

However, a CDMA 2000 1X system includes eight types of overhead messages to be transmitted, unlike the related art IS-95A system. Accordingly, the CDMA 2000 1X system requires a transmission interval of the overhead messages by 2 slots to transmit all the overhead messages for 1.28 seconds (16 slots). Also, with longer overhead messages due to additional parameters and increasing data burst messages, overload of the paging channel has occurred.

Thus, the data burst messages and the overhead messages are often transmitted on one slot. In this case, a problem arises in that a receiving rate of the data burst messages is reduced.

Also, since the data burst messages are occupied on the paging channel in a large extent, such a problem affects system performance.

SUMMARY OF THE INVENTION

Accordingly, the present invention is directed to a method for transmitting messages on a paging channel that substantially obviates one or more problems due to limitations and disadvantages of the related art.

An object of the present invention is to provide a method for transmitting messages on a paging channel in which a receiving rate of data burst messages are improved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting messages on a paging channel includes the step of first transmitting data messages while transmitting overhead messages after delaying them by a predetermined period on a corresponding slot, if the total length of the overhead messages and the data messages exceeds one slot when the overhead messages are transmitted at a constant overhead message transmission period.

Preferably, the method further includes the steps of: transmitting only the overhead messages to be transmitted while delaying the data messages by a next overhead message transmission period if the total length of the overhead messages and the data messages to be transmitted exceeds one slot and the corresponding slot is the last slot in a transmission period of the overhead messages; and transmitting the data messages on a slot having the same number as that of the corresponding slot in the next overhead message transmission period.

Preferably, the method further includes the steps of: delaying the overhead messages and the data messages to be transmitted by the next overhead message transmission period if the overhead messages are delayed by the maximum delay time period set by a system; and transmitting the data messages on a slot having the same number as that of the corresponding slot in one next overhead message transmission period.

Preferably, the method further includes the step of informing terminal units in service in a corresponding sector or in an idle handoff state through a configuration change indicator (CCI) of a corrected quick paging channel whether system information has been changed.

The overhead messages are all transmitted within one overhead message transmission period. The one overhead message transmission period is 16 slots.

The overhead messages are transmitted per 2 slots.

In another aspect of the present invention, a method for transmitting messages on a paging channel includes the steps of: first transmitting overhead messages while delaying data messages to be transmitted by a predetermined period, if the total length of the overhead messages and the data messages exceeds one slot when the overhead messages are transmitted at a constant overhead message transmission period; and transmitting the data messages on a particular slot on which the overhead messages of a next overhead message transmission period are not transmitted.

Preferably, the delayed data messages are transmitted on the same slot number as that of a prior overhead message transmission period.

Preferably, the overhead messages are all transmitted within one overhead message transmission period in serial order. all of the overhead messages are transmitted periodically in every overhead message transmission period, the overhead messages are transmitted in a next overhead message transmission period. At this time, the one overhead message transmission period are 16 slots.

Preferably, the overhead messages are transmitted per two slots for all the slots.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates an example of a method for transmitting messages on a paging channel according to the present invention.

DETAILED DESCRIPTION OF THE INVENTION

Figure 1:
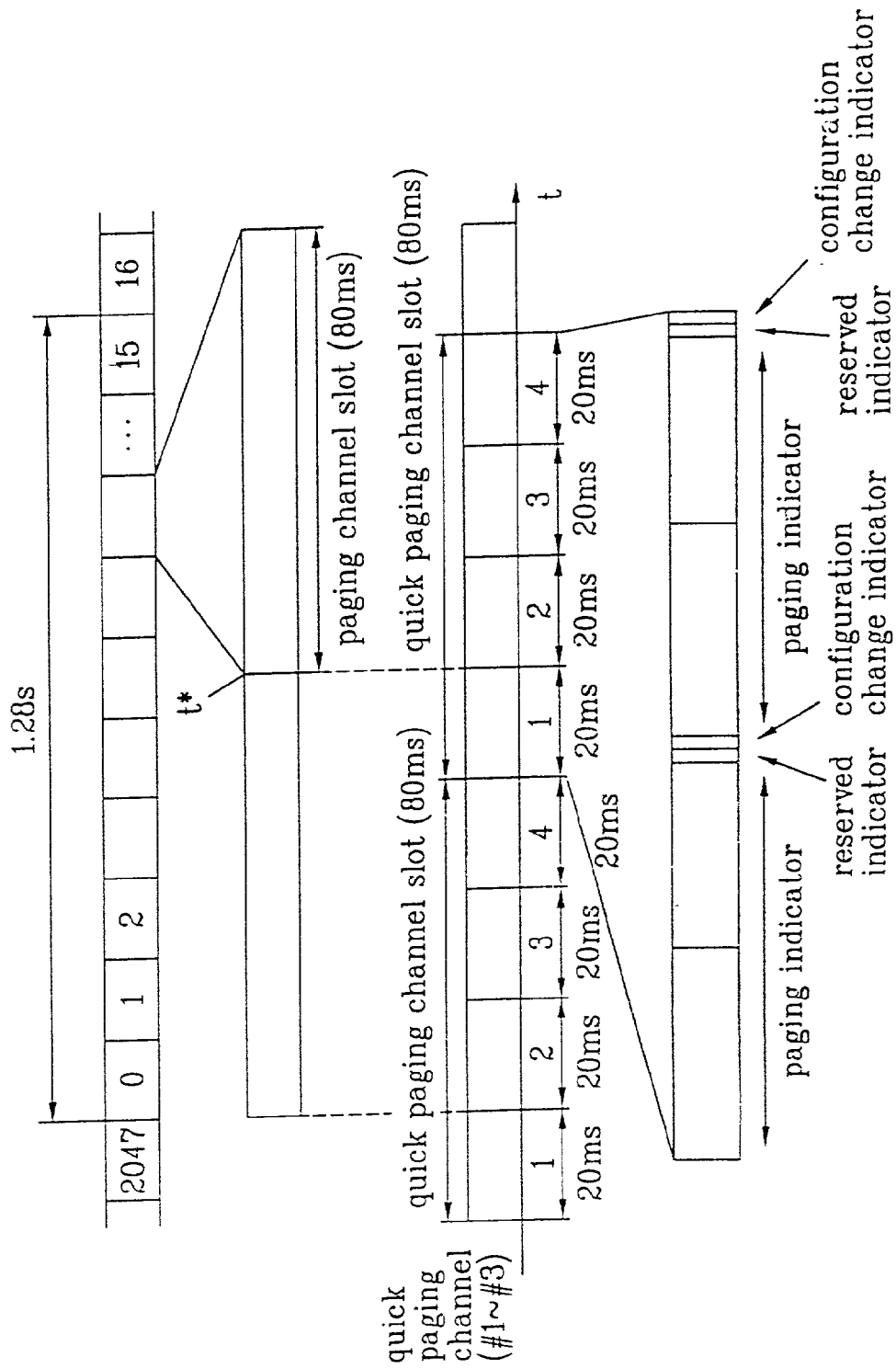
FIG. 1 illustrates a structure of a corrected quick paging channel employed in the present invention.

Reference will now be made in detail to the preferred embodiments of the present invention, examples of which are illustrated in the accompanying drawings. Wherever possible, the same reference numbers will be used throughout the drawings to refer to the same or like parts.

In the present invention, two embodiments are suggested depending on a corrected quick paging channel. That is, a method for transmitting messages in a system which does not employ a corrected quick paging channel and a method for transmitting messages in a system which employs a corrected quick paging channel are suggested.

In the first embodiment of the present invention, it is assumed that a mobile communication system and a terminal unit should support a paging channel. In the second embodiment of the present invention, it is assumed that a mobile communication system and a terminal unit should support a paging channel and a corrected quick paging channel.

The mobile communication system transmits eight overhead messages. The eight overhead messages include a system parameter message (SPM), an access parameter message (APM), a CDMA channel list message (CDMA CLM), an extended system parameter message (ESP), an extended neighbor list message (ENM), a general neighbor list message (GNN), a global service redirection message (GRM), and an extended CDMA list message (ECM). Types of the overhead messages and their transmission period depend on characteristics of the system. The transmission period of the overhead messages recommended by CDMA2000 1x is 16 slots.

First Embodiment

In the first embodiment of the present invention, a mobile communication system which does not employ a corrected quick paging channel efficiently transmits data burst messages through a paging channel.

A terminal unit is activated only on a unique slot number given per overhead message transmission period, and contents of overhead messages are sometimes changed.

Accordingly, to always acquire latest system information, a terminal unit newly in service should receive overhead messages periodically. To this end, the mobile communication system, as shown in FIG. 2, transmits eight overhead messages per 2 slots in 16 slots. In the next overhead message transmission period, the system transmits overhead messages on slots, on which the overhead messages are not transmitted in a prior overhead message transmission period, per 2 slots. Thus, all the terminal units necessarily receive the overhead messages once per 2 slots.

Slots for transmitting the overhead messages are determined as follows.

As shown in FIG. 2, the system transmits all the eight overhead messages during an overhead message transmission period.

Whenever the overhead message transmission period increases, a transmission slot location of the overhead messages moves ahead by 1 slot. In this case, a CDMA2000 1X system having an overhead message transmission period of 64 slots can equally transmit overhead messages to all the terminal units operated in a slot mode. The overhead messages can equally be transmitted for different overhead message transmission periods.

Meanwhile, in the first embodiment of the present invention, in case where the data burst messages and the overhead messages should be transmitted on one slot, the data burst messages are transmitted as follows.

Transmission parameters of the data burst messages include the number of half frames in one slot (in FIG. 1, since a paging channel slot is 80 ms and a half frame 10 ms, the number of half frames in one slot is 8), a data burst message length (SBURST_HF_LENGTH) of a half frame unit, and an overhead message length OVHD_HF_LENGTH of a half frame unit.

If the sum of the data burst message length SBURST_HF_LENGTH and the overhead message length OVHD_HF_LENGTH is greater than the number of half frames in one slot, i.e., if it exceeds one slot, priority order is given to the overhead messages so that a slot on which the data burst messages will be transmitted increases by a overhead message transmission period to delay a transmission point to the next overhead message transmission period.

In the next overhead message transmission period, no overhead messages are transmitted on a slot on which the overhead messages are transmitted, so that the probability of the data burst messages to be removed is greatly reduced.

Second Embodiment

In the second embodiment of the present invention, a mobile communication system which employs a corrected quick paging channel efficiently transmits data burst messages through a paging channel.

FIG. 1 illustrates a structure of a paging channel and a corrected quick paging channel employed in the present invention.

The paging channel includes a small channel of 80 ms unit. A terminal unit can employ a slot mode which monitors the paging channel for a particular slot while in an idle state for the other slots, so as to reduce power consumption.

A quick paging channel instructs terminal units, which are operating in a slot mode in an idle state, whether to receive paging channel messages.

The existing quick paging channel includes a paging indicator PI and a configuration change indicator (CCI). The CCI exists only on the first quick paging channel. If a transmission rate of the quick paging channel is 4.8 kbps, the last two bits within 40 ms of the first quick paging channel slot and the last two bits of the quick paging channel slot are used as the CCI. If a transmission rate of the quick paging channel is 9.6 kbps, the last four bits within 40 ms of the first quick paging channel slot and the last four bits of the quick paging channel slot are used as the CCI.

The CCI on all the quick paging channels of a corresponding sector is used as he corrected quick paging channel. The system sets the CCI of all the quick paging channels of the corresponding sector in on state and sets the PI in off state, when contents of the overhead messages are changed. Accordingly, all the terminal units in service in the corresponding sector or in idle handoff check through the CCI of its monitoring quick paging channel whether the contents of the overhead messages have been changed.

If the CCI of the corrected quick paging channel monitored by the terminal unit operating in a slot mode is in on state, the terminal unit operates in a non-slotted mode and at the same time receives all the changed overhead messages.

In the existing quick paging channel, if the overhead messages to be transmitted on a corresponding slot are delayed due to transmission of the data burst messages, the terminal units activated in a particular slot fail to receive the overhead messages for a long time. For this reason, a problem arises in that the terminal units may fail to check whether the overhead messages have been changed. However, in the corrected quick paging channel, the terminal units check through the CCI whether the overhead messages have been changed. In this case, even if the overhead messages are transmitted on the next slot not the original transmission slot by delay, the above problem does not occur.

Figure 3A:
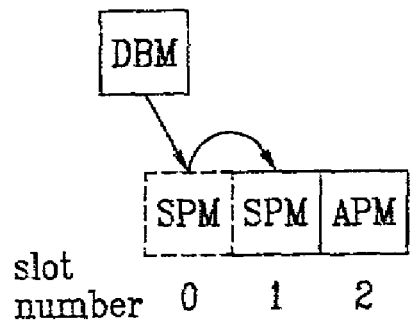
FIGS. 3A to 3C illustrate another examples of a method for transmitting messages on a paging channel according to the present invention.
Figure 3B:
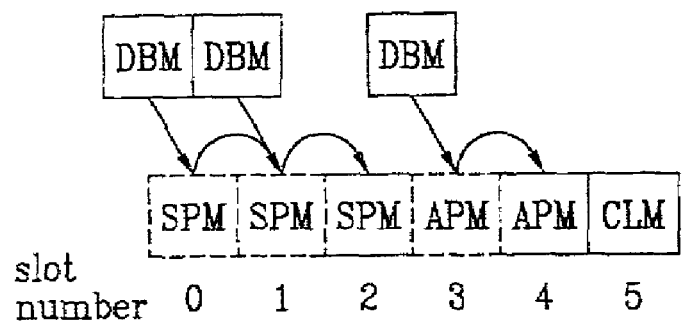
Figure 3C:
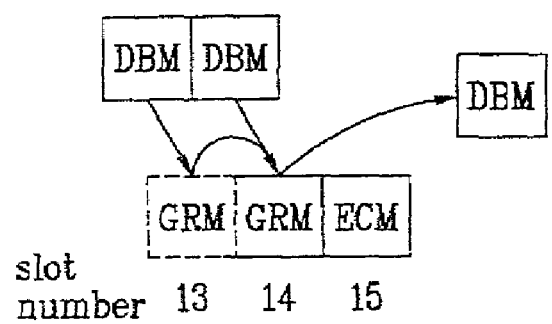

FIGS. 3A to 3C illustrate another examples of a method for transmitting messages on a paging channel according to the present invention.

As shown in FIGS. 3A to 3C, if the data burst messages should be transmitted on a slot on which the overhead messages are transmitted, the system adjusts the transmission location or the overhead messages to a slot on which the data burst messages are not transmitted. Thus, delay of the data burst messages can efficiently be reduced.

In other words, the system changes the transmission location of the overhead messages to the slot on which the data burst messages are not transmitted under the condition that all the overhead messages are transmitted within the overhead message transmission period of 16 slots.

In more detail, eight overhead messages are transmitted at least once within 16 slots. The transmission delay of the overhead messages and the data burst messages occurs only if the sum of lengths of two messages exceeds one slot.

If the sum of the lengths of two messages is less than one slot, the transmission delay does not occur and the messages can be transmitted on one slot.

However, in case where the overhead messages and the data burst messages should be transmitted on one slot and the length of the two messages exceeds one slot, the data burst messages are first transmitted on a corresponding slot and the overhead messages are delayed by the next overhead message transmission period if the overhead messages can be delayed as shown in FIG. 3A.

However, if the overhead messages cannot be delayed, the overhead messages are first transmitted on the corresponding slot and the data burst messages are delayed by the next overhead message transmission period as shown in FIGS. 2A and 2B. At this time, the data burst messages are transmitted on the same slot number of the next overhead message transmission period as the slot number of the previous overhead message transmission period on which the overhead messages are transmitted.

Meanwhile, the overhead messages assigned to the other slots except or the last slot in the overhead message transmission period of 16 slots can be delayed by the maximum 1~2 overhead message transmission period.

That is, as shown in FIG. 3B, if the data burst messages exist on the corresponding slot even when the overhead messages are delayed to the highest degree, the overhead messages are first transmitted and the data burst messages are delayed by the next overhead message transmission period. At this time, the data burst messages are transmitted on the same slot number of the next overhead message transmission period as the slot number of the previous overhead message transmission period on which the overhead messages are transmitted.

In FIG. 3C, since the overhead messages transmitted on the last slot in the overhead message transmission period, such as ECM, have no slot that can be delayed, the overhead messages are transmitted prior to the data burst messages.

As described above, the method for transmitting messages on a paging channel according to the present invention has the following advantages.

In the CDMA2000 1x system which employs a corrected quick paging channel, the data burst messages are transmitted prior to the overhead messages within a limited range. That is to say, the system changes the transmission location of the overhead messages to the slot, on which the data burst messages are not transmitted, under the condition that all the overhead messages are transmitted within the overhead message transmission period 16 slots, thereby improving a receiving rate of the data burst messages.

In addition, since the data burst messages are occupied on the paging channel in a large extent, such improvement of the receiving rate can greatly improve performance of the system.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for transmitting messages on a paging channel comprising:
    determining whether a total length of overhead messages and data messages exceeds one slot; and
    transmitting data messages while transmitting the overhead messages after delaying one of the overhead messages and the data messages by a predetermined period on a corresponding slot, if the total length of the overhead messages and the data messages exceeds one slot when the overhead messages are transmitted at a constant overhead message transmission period.

2. The method of claim 1, further comprising:
    transmitting only the overhead messages to be transmitted while delaying the data messages by a next overhead message transmission period if the total length of the overhead messages and the data messages to be transmitted exceeds one slot and the corresponding slot is a last slot in a transmission period of the overhead messages; and
    transmitting the data messages on a slot having the same number as that of the corresponding slot in the next overhead message transmission period.

3. The method of claim 1, further comprising:
    delaying the overhead messages and the data messages to be transmitted by the next overhead message transmission period if the overhead messages are delayed by the maximum delay time period set by a system; and
    transmitting the data messages on a slot having the same number as that of the corresponding slot in the next overhead message transmission period.

4. The method of claim 1, further comprising informing terminal units in service in a corresponding sector or in an idle handoff state through a configuration change indicator (CCI) of a corrected quick paging channel whether system information has been changed.

5. The method of claim 1, wherein the overhead messages are all transmitted within one overhead message transmission period.

6. The method of claim 5, wherein the one overhead message transmission period is 16 slots.

7. The method of claim 1, wherein the overhead messages are transmitted per 2 slots.

8. A method for transmitting messages on a paging channel comprising:
   determining whether a total length of overhead messages and data messages exceeds one slot; and
   transmitting overhead messages while delaying data messages to be transmitted by a predetermined period, if the total length of the overhead messages and the data messages exceeds one slot when the overhead messages are transmitted at a constant overhead message transmission period; and
   transmitting the data messages on a particular slot on which the overhead messages of a next overhead message transmission period are not transmitted.

9. The method of claim 8, wherein the delayed data messages are transmitted on the same slot number as that of a prior overhead message transmission period.

10. The method of claim 8, wherein the overhead messages are all transmitted within one overhead message transmission period in serial order.

11. The method of claim 10, wherein all of the overhead messages are transmitted periodically in every overhead message transmission period, the overhead messages are transmitted in a next overhead message transmission period.

12. The method of claim 10, wherein the one overhead message transmission period are 16 slots.

13. The method of claim 8, wherein the overhead messages are transmitted per two slots for all the slots.

14. A method comprising:
   determining if a length of overhead messages and data burst messages to be transmitted on a slot of a paging channel exceed one slot;
   transmitting the data burst message on a specific slot;
   delaying the overhead message if the determined length exceeds one slot; and
   informing terminal units whether system information has changed in a corresponding sector or in an idle handoff state based on a configuration change indicator (CCI) of a quick paging channel.

15. The method of claim 14, wherein delaying the overhead message includes delaying the overhead message to a slot on which the data burst messages are not transmitted.

16. The method of claim 14, wherein delaying the overhead message includes delaying the overhead message to another overhead message transmission period.

17. The method of claim 16, wherein the overhead transmission period includes 16 slots.

18. A method comprising:
   determining a length of overhead messages and data messages to be transmitted on a slot of a paging channel;
   transmitting the overhead messages during a first message transmission period;
   delaying the data messages, based on the determined length, to a slot having a same number in a second overhead message transmission period; and
   informing terminal units whether system information has been changed in a corresponding sector or in an idle handoff state using configuration change indicator (CCI) of a quick paging channel.

19. The method of claim 18, wherein delaying the data messages includes delaying the data message to a same slot in the second overhead message transmission period on which overhead messages are transmitted in the first overhead message transmission period.

20. The method of claim 18, wherein delaying the data messages includes delaying the data message to a particular slot on which the overhead messages of the second overhead message transmission period are not transmitted.

* * * * *